United States Patent [19]
Atadan et al.

[11] 3,923,616
[45] Dec. 2, 1975

[54] RECOVERY OF METAL VALUES FROM ORES

[75] Inventors: Erdem M. Atadan; Charles E. Coffey, both of Wilmington, Del.

[73] Assignee: E. I. Du Pont de Nemours and Company, Wilmington, Del.

[22] Filed: Oct. 1, 1973

[21] Appl. No.: 402,488

[52] U.S. Cl. .................... 204/107; 423/34; 423/39; 75/104
[51] Int. Cl.[2] ........................ C25C 1/12; C01G 3/04
[58] Field of Search ............ 423/27, 32, 35, 38, 39, 423/42, 43, 34, 140; 75/114, 104; 204/107

[56] References Cited
UNITED STATES PATENTS

| | | | |
|---|---|---|---|
| 507,130 | 10/1893 | Hoepfner | 75/118 |
| 704,639 | 7/1902 | Hoepfner | 75/108 |
| 1,041,407 | 10/1912 | de Alzugaray | 423/38 |
| 1,050,629 | 1/1913 | Edison | 75/103 |
| 1,075,093 | 10/1913 | David | 75/104 |
| 1,736,659 | 11/1929 | Mitchell | 75/104 |
| 3,682,592 | 8/1972 | Kovacs | 423/140 |
| 3,764,490 | 10/1973 | Chambers | 204/107 X |
| 3,776,826 | 12/1973 | Atadan | 204/107 |
| 3,785,944 | 1/1974 | Atwood et al. | 75/114 X |
| 3,798,026 | 3/1974 | Milner | 423/34 |
| 3,849,269 | 11/1974 | Hartwig et al. | 204/107 |

*Primary Examiner*—Oscar R. Vertiz
*Assistant Examiner*—Brian E. Hearn

[57] ABSTRACT

Metal values, e.g. copper, are extracted from sulfide ores, e.g. chalcopyrite, by leaching the ore in one or more stages with an aqueous solution containing iron ions and sufficient chloride ions to maintain the desired metal values in solution at a temperature of at least 80°C. with an oxygen-containing gas intimately dispersed in the solution preferably at a pressure of at least 75 psia.

20 Claims, 2 Drawing Figures

RECOVERY OF METAL VALUES FROM ORES

BACKGROUND OF THE INVENTION

1. Field of the Invention

This invention relates to the recovery of metal values from ores and principally from concentrates obtained by selective froth flotation of copper-bearing sulfide ores. Conventional processes for recovering metal values from low-grade ores and especially sulfide ores of copper have involved smelting of the concentrates and subsequent electrorefining. Hydrometallurgical processes are being investigated as alternatives to conventional smelting of the above ores principally to reduce atmospheric pollution.

2. Description of the Prior Art

It has been known for some time that copper and iron may be leached from a sulfide form of the metals by a solution of cupric chloride in a solvent for the resultant cuprous and ferrous chlorde. In U.S. Pat No. 552,960, issued Jan. 14, 1896, the basic reaction of cupric chloride with cupric sulfide is disclosed. U.S. Pat. No. 507,130, issued Oct. 24, 1893, discloses the same basic reaction and discusses, in addition, the leaching of silver sulfide. The patentee teaches that the presence of iron in electrowinning results in an impure metal and suggests that iron be removed by injecting air or oxygen into the pregnant solution prior to electrolysis to form the oxychloride of copper which acts as a precipitant for the iron oxide. Another disclosed advantage of such an oxidation was the regeneration of cupric chloride in the presence of acid. U.S. Pat. No. 704,639, issued on July 15, 1902 discusses the electrowinning of copper from a solution obtained by leaching argentiferous or cupriferous ores with a cupric chloride solution which is less than saturated with the chlorides of alkaline or alkaline earth metals. However, the patentee teaches that it is almost impossible to electrowin a homogenous copper except in the absence of cupric chloride and iron.

U.S. Pat. No. 1,588,806, issued on June 15, 1926 teaches the leaching of copper-bearing sulfide ores using ferric chloride and, more recently, the combination of ferric chloride and cupric chloride as leaching agents has been disclosed in U.S. Pat. No. 3,674,424, issued on July 4, 1972. Electrooxidation of a chloride solution at elevated temperature is discussed in U.S. Pat. No. 3,673,061, issued on June 27, 1972. Processes have been developed for acid or base leaching at elevated temperatures and pressures in the presence of an oxygen-containing gas, e.g. U.S. Pat. No. 3,174,849, issued on Mar. 23, 1965, discloses dispersing a nonferrous metal bearing material in water and heating the resultant slurry to 300°F. under an oxygen partial pressure of at least 10 pounds per square inch until substantially all of the desired nonferrous metal values are converted to the hydroxide or basic metal salt form. Acid is added to the cooled slurry to convert the nonferrous metal values to soluble sulfates which are recovered by known methods.

The present invention offers various advantages over the prior art in that a rapid and complete leaching of the desired metal values and removal of iron is obtained by contacting the leach solution and mineral at elevated temperatures in the presence of oxygen. In one embodiment of the present invention the resultant pregnant liquor is further contacted with a reducing agent, e.g. unreacted ore to provide a solution having sufficient cuprous ion therein to permit effective electrowinning of copper in a pure form with minimum power requirements. The present process removes iron, sulfur and gangue in a readily filterable form with the minimum concomitant loss of copper.

SUMMARY OF THE INVENTION

Copper is recovered from sulfide ores and ore concentrates containing minerals such as chalcopyrite ($CuFeS_2$), chalcocite ($Cu_2S$), bornite ($Cu_5FeS_4$), and covellite ($CuS$), and the like as well as from cement copper and from ore concentrates containing oxide copper minerals mixed with sulfide minerals by a hydrometallurgical process comprising contacting the ore or concentrate with an aqueous leach solution containing at least 10 grams per liter of iron ions along with at least sufficient chloride ions to form soluble metal chloride with the nonferrous metal values leached from the ore. Temperature is maintained at at least 80°C. and preferably 95°–105°C. A molecular oxygen-containing gas is intimately dispersed in contact with the ore and leach liquor conveniently by maintaining a partial pressure of oxygen of at least 75 psia and preferably at least 90 psia with agitation. At least a portion of the iron precipitates as ferric hydroxide from the leach solution during the leaching. Copper ions are optionally also present in the initial leach solution. More particularly, the present invention involves recovering metal values from copper-containing concentrates of sulfide ores by contacting the concentrate with a leach solution comprising copper and iron chlorides in at least two stages with the metal values in said concentrate being partially leached in the initial stage under reducing conditions and substantially completely leached in the final stage in contact with molecular oxygen-containing gas wherein the amount of iron entering the system is precipitated as ferric hydroxide. Sufficient excess chloride ion is maintained in both of the stages to keep the desired metal values in solution. The pregnant solution (feed electrolyte) from the initial stage is directed to electrowinning wherein a portion of the copper is recovered as cathode copper, while the depleted leach solution (spent electrolyte) is returned to the final stage of leaching along with the solids from the initial stage of leaching. The temperature in the leaching is maintained at at least 80°C. In the final stage an oxygen-containing gas is intimately dispersed in the medium to maximize contact of the reactants and to assure adequate reaction conveniently by maintaining a partial pressure of oxygen of at least 75 psia with agitation.

BRIEF DESCRIPTION OF THE DRAWING (FIG. 1)

Concentrate is ground in mill 1 and directed to the initial step of leaching 2 where it is contacted with a leach solution from the final leaching step 4 introduced via line 10. The solids from the initial step of leaching are separated from the liquid in separator 3 and the solids are then contacted with the liquid in the final leaching step 4. The liquid from the liquid-solid separator 3 optionally is directed to silver removal 5 and thence to electrowinning 6 where substantially pure copper is recovered. The liquid from the electrowinning 6 is recycled via line 7 to the final leaching step 4. Impurity concentrations are controlled and residual copper is recovered by treating portion 8 of the stream from the electrowinning in purge recovery 9.

DETAILED DESCRIPTION OF THE INVENTION

Figure 1:
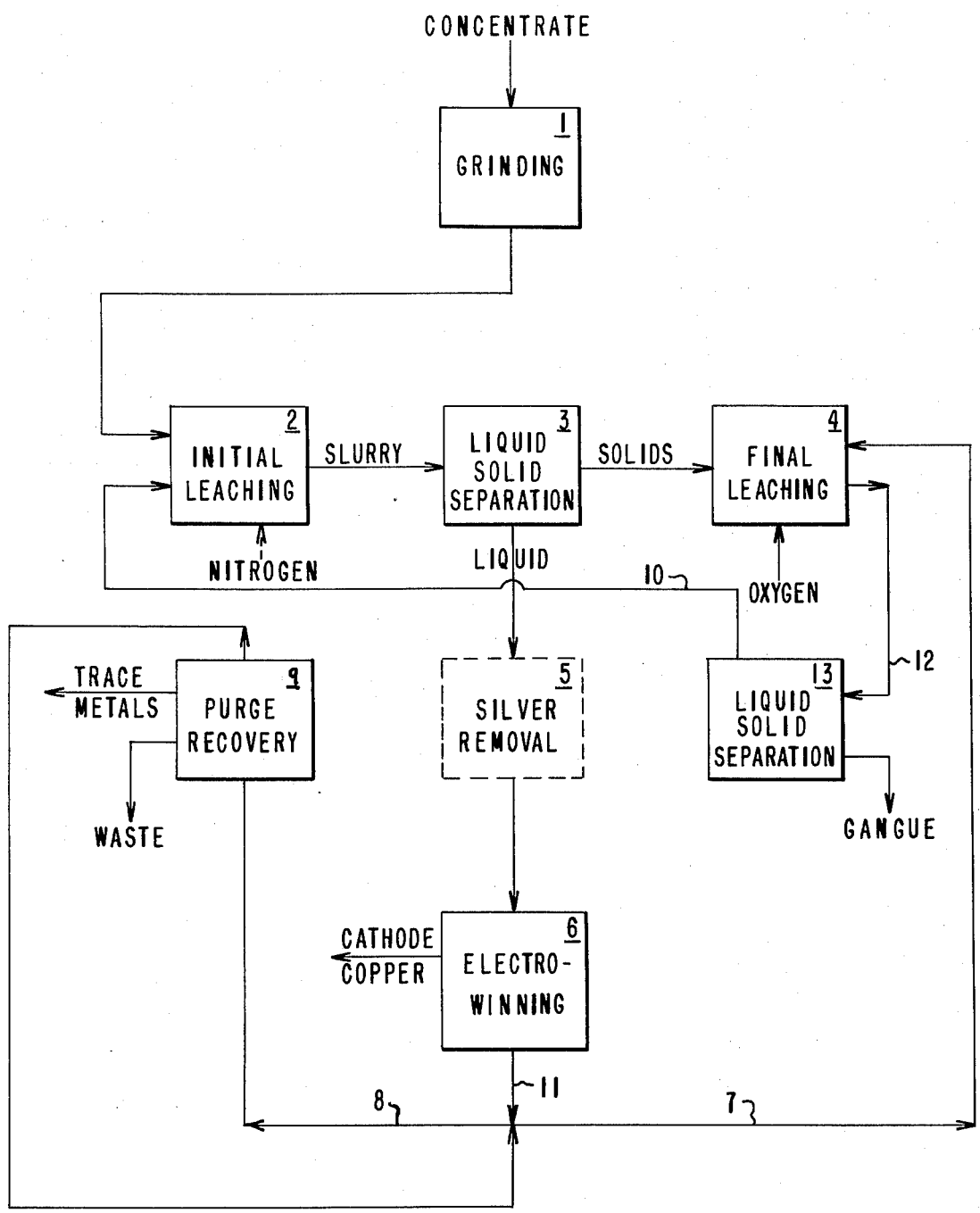

The present invention involves two major steps, i.e. a combined leaching-oxidation and electrowinning. The leaching provides substantially complete removal of soluble copper compounds from the ore and precipitation of iron, and the electrowinning recovers substantially pure copper.

Usually the starting material for the present invention is a high-grade copper and iron-containing sulfide concentrate obtained by selective froth flotation of copper-bearing sulfide ores. Such concentrates can contain nonferrous metals such as silver, zinc, nickel, tellurium, cobalt, cadmium and the like, in addition to copper and the present invention contemplates these metals. However, the present process is applicable to most ores containing the aforesaid materials. Since the leaching rate is increased by increasing the surface area of the mineral, it may be desirable to grind the concentrate to an optimum particle size for treatment in the process consistent with economical operation and solids handling in the process. Usually it is advantageous to grind the concentrate in a closed-circuit grinding mill 1 of conventional design so that about 95% will pass −325 mesh standard Tyler screen. The following is a discussion of the various steps of the present process and their integration. It is to be understood that the cuprous and cupric ions referred to herein exist as chloride complexes.

Leaching

Leaching can be conducted in one step but preferably is conducted in more than one step to increase the efficiency of the process. The one-step leaching is referred to herein as the final leaching step wherein essentially all of the desired metal values, principally copper, are dissolved under pressure and in the presence of oxygen from the ore, or ore concentrate, and a pregnant leach solution containing no significant amounts of iron is obtained for subsequent recovery of metal values therefrom. The solids from the final leaching which contain principally sulfur, insoluble iron compounds and gangue are discarded after suitable treatment, e.g. washing, to recover any significant metal values therein.

Since the final leaching step can be practiced independent of another leaching step, it is set forth in detail immediately herein below and is followed by a discussion of the preferred multiple stage leaching.

The following is illustrative for the overal reaction of ferric and ferrous ions, respectively, in the leaching of chalcopyrite, it being understood that significant amounts of copper ions can also be present.

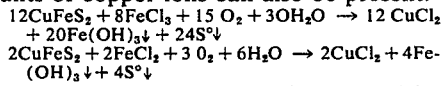

The ore or ore concentrate introduced in the final stage can be unreacted or partially reacted concentrate and is contacted with an aqueous solution containing at least 10 and preferably about 20 grams per liter of iron ions and at least sufficient chloride ion to form soluble metal chlorides of the nonferrous metal values with an excess of chloride ions being preferred. Sufficient chloride should also be provided in this stage to maintain in solution desired metal values which may be leached in subsequent or earlier stages. Under these conditions sufficient iron ions are present to leach at an acceptable rate while the desired metal values which are leached are maintained in solution. Iron ions must be present when concentrate and oxygen are in contact at elevated temperature to prevent the formation of the copper oxychlorides which can precipitate and thereby complicate the treatment of the residue. Chloride in excess of that available from the iron chlorides, i.e. ferrous and ferric chloride or from copper chlorides, i.e. cuprous and cupric chloride may be supplied from any number of metal chlorides including, but not limited to, sodium chloride, calcium chloride, potassium chloride and zinc chloride. Ammonium chloride is preferred because it provides a pregnant leach solution of low density and viscosity resulting in high mass transfer and easy liquid/solid separation. The use of ammonium chloride provides a solution of high electrical conductivity and yields a less dendritic copper deposit in subsequent electrowinning. Generally above 3.5 gram equivalents of chloride per kilogram of solution are employed to provide maximum solubility of product salts.

The pH of the leach solution is maintained in the range 2.4–6 and preferably 2.7–3.5 to insure rapid reaction, adequate solubility of desired metal values and precipitation of a substantial portion of the iron during the leaching.

The temperature maintained in the final leaching should be at least 80°C. and preferably in the range 95°–105°C. Temperatures in excess of about 110°C. must be avoided because the desired metal values and especially copper tend to form insoluble compounds at these elevated temperatures in the absence of iron ions and appear in the gangue thereby reducing recovery via the leach solution and complicating the subsequent treatment of the solids from this leach step.

The oxygen should be intimately dispersed in the leach solution, e.g. by introducing the gas in the bottom of the leach vessel in a finely-divided form and/or by agitation of the slurry by mechanical means. A particularly convenient, and possibly necessary method to assure satisfactory reaction rates is to conduct the final leaching under a partial pressure of molecular oxygen of at least 75 psia and preferably above 90–100 psia with agitation. Generally at least 0.5 parts of oxygen per part of solids are introduced in the final stage of leaching. The upper limit of pressure is dictated by practical considerations such as vessel design and economics. A reaction period of at least one hour, and preferably 2–3 hours, should be employed. The pregnant solution from this leaching can be treated directly to remove the metal values, e.g. by solvent extraction, electrowinning or precipitation.

In a preferred embodiment of the present invention the final stage of leaching is coupled with one or more initial stages where the pregnant leach solution from the final stage is contacted with a reducing agent such as cement copper or preferably unreacted ore concentrate to reduce the cupric ion to the cuprous ion thereby requiring one electron transfer to electrowin copper as metal. The partially leached solids from this initial stage are directed to the final stage where, as described hereinabove, the leaching is substantially completed. The approximate stoichiometry for this initial stage using chalcopyrite as the mineral is

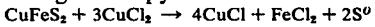

Approximately 50% molar excess reducing agent is conveniently employed in a one-stage initial leach whereas in a multiple stage initial leach over 200% excess reducing agent can be employed. The liquid and solids are thoroughly contacted at a temperature of at least 80°C. and preferably 95–105°C. under atmospheric or superatmospheric pressure for a period of at least one hour or until substantially all of the cupric ion is reduced to cuprous ion. The liquid and solids are separated and the liquid is directed to electrowinning where 30 to 70%, and preferably about 50%, of the copper in the liquor is removed as cathode copper by known methods in compartmented cells and described more fully hereinbelow.

Desirably, the pregnant leach solution is directed to the cathode compartment of an electrolytic cell where the copper which is leached in the leaching step (approximately 30–70% of the total copper in the solution when chalcopyrite is being processed) is electrowon on the cathode and is then directed to the anode compartment where equivalent oxidation occurs. The cell is a standard type of agitated cell having a separator, i.e. a porous diaphragm or ion exchange membrane between the anode and cathode sections to prevent the anodic oxidation products, e.g. the cupric ion, from reaching the cathode, thereby reducing the current efficiency. Regardless of the electrowinning techniques employed agitation is desirably employed, e.g. by dispersing nitrogen at the bottom of both electrodes. For ease of operation it is preferred to conduct the electrowinning at a temperature in the range of 40°–60°C. The usual current density employed in electrowinning is about 10–30 amperes per square foot but with vigorous agitation, elevated temperature and the addition of agents such as gelatin and/or glue, the current density can be increased.

A more complete understanding of the integrated process of the present invention may be had by referring to the drawing of FIG. I attached hereto and made a part of the present specification. Reference numerals correspond to the drawing. The ore or ore concentrate is usually prepared for leaching in grinding will 1 where the particles are reduced to convenient size, e.g. 95% passing a −325 mesh standard Tyler screen prior to introduction into the initial leaching 2. Pregnant leach solution from the final leaching 4 is introduced via line 10 to contact the unreacted concentrate in one or more stages under the conditions set forth hereinabove to reduce substantially all of the cupric ion to the cuprous ion. An inert or optionally reducing atmosphere can be maintained above the reactants, e.g. by the introduction of nitrogen or hydrogen. The liquid and solids in the slurry issuing from this leach are directed to separator 3 and the liquid directed to electrowinning 6 after being treated if necessary, to remove metal values which interfere with electrowinning pure wire-grade copper. By way of illustration silver removal step 5, shown in dotted lines, can comprise a modified electrowinning procedure in which the solution is maintained above about 30°C. and preferably 40°–70°C. and electrolyzed employing a low current density, e.g. less than about 1.0 and preferably less than 0.1 ampere/ft$^2$. Due to the low current density it is advantageous to employ a fluidized bed cathode or an equivalent arrangement which provides a high surface area for electrowinning the silver. The silver may be electrolytically dissolved into a chloride solution, e.g. NH$_4$Cl and thereafter recovered from the solution by known methods. Under these conditions silver is preferentially reduced to a concentration of less than 1 ppm before the solution is directed to the electrolytic cell.

A substantial portion of the copper is recovered in electrowinning 6 and usually involves reducing the concentration of cuprous ion from about 60–80 grams/liter to about 30–40 grams/liter. Ions of iron, zinc, lead, aluminum and magnesium which can be present depending upon the composition of the ore being processed pass through electrowinning 6. The level of these and other trace metals with the exception of iron are controlled by purge recovery 9 wherein metal values are removed and recovered where economics warrant according to the following exemplary technique.

Approximately 2–10% of the stream from electrowinning is directed to an electrolytic cell where the major portion of the copper is removed following which the remaining copper is recovered by cementation on iron. After cementation the pH of the stream is increased with cooling or under pressure to approximately 10.0 with gaseous ammonia in the presence of oxygen whereupon iron hydroxide and aluminum hydroxide along with some magnesium and lead hydroxide precipitate but are not separated. The pH of the resultant slurry is then increased to approximately 11.0 by the addition of calcium oxide whereupon substantially all of the magnesium and lead hydroxides precipitate. All solids are then separated from the liquid. The pH of the liquid is then further increased to approximately 12.5 with additional calcium oxide and heated to approximately 105°C. whereupon zinc hydroxide mixed with zinc oxide precipitates and gaseous ammonia is evolved. The ammonia evolved in this step along with that evolved in previous steps is recycled. Sufficient sulfuric acid is then added to precipitate calcium as calcium sulfate which is separated from the liquid which is returned to the process. Trace amounts of other metals are removed from the present process via the gangue, iron oxide precipitate and the solid waste from the purge.

The major portion of the partially spent leach solution is returned via line 7 to the final leaching 4 where it is contacted in one or more stages with the partially leached solids from separator 3. Makeup leach solution can be added in this leach as necessary to maintain the desired chloride and iron concentration and pH. The slurry from leach 4 is then directed to separator 13 via line 12. The pregnant leach solution is directed to the initial leach 2 via line 10 while the solids are discarded via line 14 after treatment to recover the nonferrous metal values therein. Solutions must be maintained above the crystallization temperature throughout the main circuit in the process.

The following examples are presented to illustrate but not restrict the present invention. Parts and percentages are by weight unless otherwise noted.

EXAMPLES 1–3

The following examples illustrate a one-step leaching of the process of the present invention.

Figure 2:
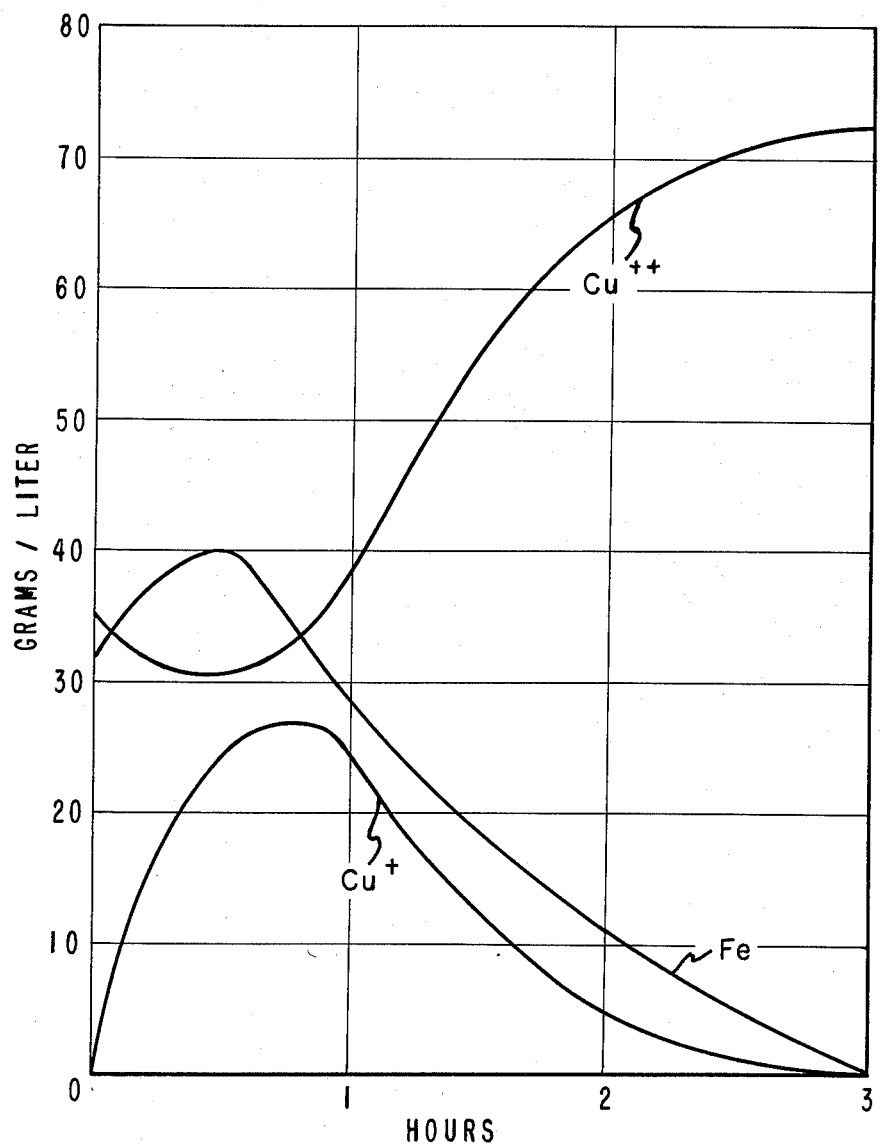

A Fisher-Porter glass pressure reactor equipped with gas inlets for oxygen and nitrogen, back pressure regulator and magnetic stirring was employed to conduct the leach. The apparatus was charged with 150 ml. of a leach solution containing 94.0 g. CuCl$_2$.2H$_2$O, 109.6 FeCl$_2$.4H$_2$O, 215 g. NH$_4$Cl and 5 ml. concentrated HCl per liter of solution along with 19.5 g. of chalcopyrite concentrate containing 27.0% Cu, 26.6% Fe, 29.4% S, 0.25%Zn, 0.24% Mo, by analysis which concentrate was wet ground such that 95% passed through a −325 mesh standard Tyler screen. The reactor was closed, immersed in the oil bath and pressurized to 100 psig with oxygen against a slightly smaller nitrogen pressure in order to maintain a flow rate usually of at least 430 ml. but less than 725 ml. of oxygen per minute following which stirring was started. The oil was then heated. After approximately 30 minutes the oil bath attained a temperature of 100°C. After the time indicated in Table I the tube was removed from the oil bath and its contents filtered through a glass fritted funnel. The residue was washed free of soluble copper with hot water and dried under vacuum at 130° for 12 hours. The dry solids were analyzed for copper by decomposing a two-gram sample thereof with concentrated nitric acid in a glass dish followed by evaporation to dryness three times to remove all chlorides from the sample. Approximately 25 ml. of water was added to the chloride-free mixture which was then filtered to remove sulfur and gangue. The clear filtrate was made up to 100 ml. with water and analyzed by spectrophotometry (ethylenediamine method) from which the percent copper leached was determined and is set forth in Table I. The pregnant leach solution was analyzed for cuprous, cupric and ferric ions and the results are set forth in FIG. 2 which shows the variance in ion concentrations in grams per liter vs. time of leaching in hours. The disappearance of iron is due to the formation of its insoluble hydroxide. Initially cuprous ion is generated by leaching and subsequently disappears due to its oxidation to the cupric ion.

EXAMPLES 4–6

Into a stainless steel autoclave equipped with an agitator and a gas manifold to permit the introduction and control of oxygen pressure were charged 500 ml of a solution containing 107 g. $FeCl_2.4H_2O$, 215 g. $NH_4Cl$, 5 ml. concentrated HCl, the amount of $CuCl_2.2H_2O$ set forth in Table II and sufficient water to make up one liter along with 64.6 g. chalcopyrite concentrate having the composition and ground as set forth in Examples 1–3. The autoclave was heated to 105°C. under 100 psig oxygen pressure at an oxygen flow rate of 250 ml. per minute under agitation and maintained at that temperature for three hours following which the copper content of the residue was determined as in Examples 1–3 with the results set forth in Table II.

These examples demonstrate that effective leaching can be realized without the addition of copper ions to the leach solution.

EXAMPLE 7

The following example illustrates a two-stage leach according to the process of the present invention. In order to simulate the initial leach a solution was prepared containing 105.5 g. $CuCl_2.2H_2O$ and 160.5 g. $NH_4Cl$ made up to 750 ml. with water and contacted with 96.9 g. of chalcopyrite concentrate of Examples 1–3 at a temperature of 103°C. for a period of three hours under nitrogen pressure. The resulting solution contained 68.0 g. $Cu^{+1}$ per liter and 15.4 g. $Fe^{+2}$ per liter. The residue which weighed 72.1 grams contained 215.4 mg. Cu per gram. Approximately 11.8 g. of this partially leached concentrate was then contacted with a 150 ml. portion of a leach solution prepared by combining 23.5 g. $CuCl_2.2H_2O$, 13.7 g. $FeCl_2.4H_2O$ and 53.7 $NH_4Cl$ made up to 250 ml. with water. The partially leached concentrate and leach solution were maintained at 100°C. under a pressure of 100 psig of oxygen for a period of three hours with a flow of oxygen of approximately 0.77 liters per minute. The resulting filtrate contained 51.7 g. per liter of $Cu^{+2}$ and based on the analysis of the residue, represented 99.5% copper leached.

It was determined that slurries having pulp densities of 6.8 and 11.2% could be readily treated. Higher pulp densities, e.g. 17.5% or higher, are considered within the purview of this invention.

Decreasing the temperature of the leach below about 80°C. or above about 120°C. sharply reduced the copper leached to the pregnant solution as did a reduction in the leaching time to less than one hour as shown in the comparison accompanying Examples 1–3.

In addition to silver, other metals such as selenium and tellurium which can interfere with the electrowinning of exceptionally pure copper can be removed from the pregnant leach liquor, e.g. by cementation on copper and thereafter recovered if economically justified.

TABLE I

| Example No. | Time (hours) | % Cu Leached |
|---|---|---|
| Comparison | 0.5 | 52 |
| 1 | 1 | 77 |
| 2 | 2 | 94 |
| 3 | 3 | 99.3 |

TABLE II

| Example | $CuCl_2.2H_2O$ (gms) | % Cu Leached |
|---|---|---|
| 4 | 94 | 98.7 |
| 5 | 9.4 | 98.9 |
| 6 | 0 | 99.0 |

We claim:
1. The process for the leaching of metal values from minerals comprising copper, iron and sulfur comprising contacting said minerals with an aqueous leach solution containing at least 10 grams per liter of iron ions and sufficient chloride ion to form soluble metal chlorides of the nonferrous metal values leached from said minerals at a pH in the range of about 2.4–6 at a temperature of at least 80°C. in the presence of a molecular oxygen-containing gas intimately dispersed therein while precipitating ferric hydroxide from the said leach solution.

2. The process of claim 1 wherein the temperature is maintained in the range 95°–105°C.

3. The process of claim 2 wherein the partial pressure of oxygen is maintained at at least 90 psig.

4. The process of claim 3 wherein the precipitation is continued until the leach solution is substantially free of iron.

5. The process of claim 1 wherein cupric ion is initially present in the leach solution.

6. The process of claim 4 wherein cupric ion is initially present in the leach solution.

7. A process for recovering metal values from copper and iron containing sulfide minerals which comprises (a) contacting said minerals in at least two stages with a leach solution at a pH in the range of about 2.4–6 comprising copper chlorides in the initial stage and iron chlorides in the final stage whereby the metal values in said minerals are partially leached in the initial stage and the cupric ion is reduced to the cuprous ion and substantially leached in the final stage in intimate contact with molecular oxygen-containing gas while precipitating ferric hydroxide and wherein sufficient chloride ion is provided in both of said stages to maintain the desired metal values in solution, (b) separating the liquids and solids from the initial stage and directing said solids to said final stage, (c) electrowinning a portion of the copper values in the liquid from step (b), and (d) directing the liquid from step (c) to the final stage of leaching, said leaching being conducted at a temperature of at least 80°C.

8. The process of claim 7 wherein the oxygen partial pressure is at least 90 psia.

9. The process of claim 8 wherein the cupric ion is reduced to cuprous ion in the initial stage by contacting said leach solution with excess minerals.

10. The process of claim 7 wherein the final stage is conducted at a temperature in the range 95°–105°C.

11. The process of claim 9 wherein the final stage is conducted at a temperature in the range 95°–105°C.

12. The process of claim 11 wherein at least 0.5 parts of oxygen per part of solids from step (b) are introduced in the final stage of leaching.

13. The process of claim 11 wherein the copper mineral is substantially chalcopyrite.

14. The process of claim 13 wherein the liquid from the initial stage contains 30 to 90 grams of cuprous ion per liter.

15. The process of claim 13 wherein at least 50% excess chalcopyrite is maintained in the initial leaching.

16. The process of claim 7 wherein at least 3.5 gram equivalents of chloride per kilogram of solution is maintained in each leach.

17. The process of claim 10 wherein at least 3.5 gram equivalents of chloride per kilogram of solution is maintained in each leach.

18. The process of claim 3 wherein iron ions are present when said minerals are in contact with said oxygen-containing gas.

19. The process of claim 10 wherein iron ions are present when said minerals are in contact with said oxygen-containing gas.

20. The process of claim 10 wherein inert gas is introduced in said initial stage.

* * * * *